(12) United States Patent
Lawlor

(10) Patent No.: US 7,662,414 B1
(45) Date of Patent: Feb. 16, 2010

(54) EASILY-DIGESTIBLE PET CHEW THAT PROMOTES ORAL HEALTH AND PREVENTS MALODOROUS BREATH IN ANIMALS, AND METHOD OF MAKING THEREOF

(75) Inventor: Anthony Lawlor, Valley Center, CA (US)

(73) Assignee: JAKKS Pacific, Inc., Malibu, CA (US)

( * ) Notice: Subject to any disclaimer, the term of this patent is extended or adjusted under 35 U.S.C. 154(b) by 735 days.

(21) Appl. No.: 11/489,746

(22) Filed: Jul. 18, 2006

(51) Int. Cl.
*A23K 1/18* (2006.01)

(52) U.S. Cl. .......................... 426/2; 426/104; 426/132; 426/573; 426/805

(58) Field of Classification Search ............... 426/2, 426/104, 132, 573, 805
See application file for complete search history.

(56) References Cited

U.S. PATENT DOCUMENTS

| | | | |
|---|---|---|---|
| 4,454,163 A | 6/1984 | Gellman et al. | |
| 4,454,164 A | 6/1984 | Gellman et al. | |
| 4,534,989 A | 8/1985 | Gellman et al. | |
| 4,534,990 A | 8/1985 | Gellman et al. | |
| 4,546,001 A | 10/1985 | Gellman et al. | |
| 4,551,343 A | 11/1985 | Gellman et al. | |
| 4,735,808 A | 4/1988 | Scaglione et al. | |
| 4,743,458 A | 5/1988 | Gellman et al. | |
| 4,743,459 A | 5/1988 | Gellman et al. | |
| 4,743,460 A | 5/1988 | Gellman et al. | |
| 4,743,461 A | 5/1988 | Gellmen et al. | |
| 4,904,494 A | 2/1990 | Spanier | |
| 4,904,495 A | 2/1990 | Spanier | |
| 4,997,671 A | 3/1991 | Spanier | |
| 5,000,943 A | 3/1991 | Scaglione et al. | |
| 5,000,973 A | 3/1991 | Scaglione et al. | |
| 5,015,485 A | 5/1991 | Scaglione et al. | |
| 5,094,870 A | 3/1992 | Scaglione et al. | |
| 5,200,218 A | 4/1993 | Lasater et al. | |
| 5,292,527 A * | 3/1994 | Konopa | 424/54 |
| 5,296,209 A * | 3/1994 | Simone et al. | 424/49 |
| 5,967,154 A | 10/1999 | Anderson | |
| 5,989,604 A | 11/1999 | Wolf et al. | |
| 6,080,419 A * | 6/2000 | Stookey | 424/442 |
| 6,110,521 A | 8/2000 | Axelrod | |
| 6,159,508 A | 12/2000 | Wolf et al. | |
| 6,228,402 B1 | 5/2001 | Wolf et al. | |
| 6,265,011 B1 | 7/2001 | Kelly et al. | |
| 6,455,083 B1 * | 9/2002 | Wang | 426/104 |
| 6,511,687 B2 | 1/2003 | Hoy | |
| 6,521,215 B2 | 2/2003 | Okay | |
| 6,660,319 B1 * | 12/2003 | Shi et al. | 426/533 |
| 6,746,681 B1 | 6/2004 | Carroll | |
| 6,838,101 B2 | 1/2005 | Hoy | |
| 2002/0090420 A1 | 7/2002 | Hoy | |
| 2003/0152666 A1 | 8/2003 | Hoy | |
| 2003/0215547 A1 * | 11/2003 | Leyh, Jr. | 426/98 |
| 2004/0086616 A1 | 5/2004 | Nie et al. | |
| 2004/0213755 A1 | 10/2004 | Hochwalt et al. | |
| 2004/0241390 A1 | 12/2004 | LeBoeuf et al. | |
| 2005/0106289 A1 | 5/2005 | Hoy | |
| 2005/0158252 A1 | 7/2005 | Romanowski et al. | |
| 2007/0212473 A1 * | 9/2007 | Pater et al. | 426/635 |
| 2008/0286318 A1 * | 11/2008 | Spindler et al. | 424/401 |

FOREIGN PATENT DOCUMENTS

EP 824019 A1 * 2/1998

OTHER PUBLICATIONS

Smilanick et al., Plant Disease, Feb. 1999, pp. 139-145.*

* cited by examiner

*Primary Examiner*—C. Sayala
(74) *Attorney, Agent, or Firm*—Tope-McKay & Associates

(57) ABSTRACT

The present invention is directed to an easily-digestible pet chew for promoting oral health and preventing malodorous breath in animals. The pet chew is formed with ingredients selected to promote mastication and ease digestibility, and additionally includes baking soda and abrasives to reduce tartar and plaque and eliminate malodorous breath. The pet chew has a soft, malleable texture that is easily chewed by animals and easily digested once swallowed. The pet chew also includes a white coloring interspersed with colored crystals formed in a bone-like shape that appeals to both animals and their owners.

23 Claims, 1 Drawing Sheet

EASILY-DIGESTIBLE PET CHEW THAT PROMOTES ORAL HEALTH AND PREVENTS MALODOROUS BREATH IN ANIMALS, AND METHOD OF MAKING THEREOF

BACKGROUND OF THE INVENTION (1) Technical Field

The present invention relates to the field of edible pet chews, and specifically to pet chews that are easy to digest and have properties that improve oral health and eliminate malodorous breath in animals.

(2) Background

It is well known that household pets such as dogs and cats often suffer from poor oral health. This problem also manifests itself with bad breath, which is particularly unpleasant in dogs. Many edible pet chews have been developed to promote fresh breath in dogs and reduce tartar buildup. However, edible pet chews are often hard, brittle, and difficult to digest. Dogs chewing these pet chews usually break them into pieces which are sharp and can cause damage to the digestive tract once swallowed. Other times, the chews are swallowed whole, where they can easily become lodged in a dog's throat and cause choking, or become lodged in a dog's digestive tract, requiring surgery to remove and sometimes leading to death. One recent test demonstrated that a typical hard pet chew dissolved only 34.6% in a digestive simulation test over the better part of a day.

Additionally, most edible pet chews directed to promoting oral health and eliminating malodorous breath are ineffective due to the hardness of the chew. A typical pet chew operates to remove plaque and tartar from a dog's teeth by the chewing action whereby the abrasive texture of the pet chew scrapes the plaque and tartar from the teeth. In a typical hard, brittle dog chew, this chewing action is brief, as the dog will usually quickly break the pet chew apart and swallow the pieces or even swallow the pet chew whole without chewing at all. Therefore, the oral health advantages of these dog chews are negated. The ingredients included to prevent or eliminate malodorous breath suffer from the same limitation, in that the shorter time period the dog chew is in the dog's mouth, the less effective the ingredients are at eliminating the bacteria and odor that leads to bad breath.

Additionally, the ingredients used in existing pet chews to combat malodorous breath are numerous but still limited by their compatibility with other pet chew ingredients and the processing used to form most pet chews. One of the most effective treatments of malodorous breath is baking soda, otherwise known as sodium bicarbonate. However, its reactive nature has prevented it from being implemented into the pet chews thus far.

Thus, what is needed is a pet chew with a texture that promotes mastication, is easily digested, and contains effective ingredients to promote oral health and prevent malodorous breath in animals.

SUMMARY OF THE INVENTION

The present invention is directed to an easily-digestible pet chew for promoting oral health and preventing malodorous breath in animals. The pet chew is formed with baking soda and other materials to promote mastication and ease digestibility, and additionally reduce tartar, plaque, and eliminate malodorous breath. The pet chew has a soft, malleable texture that is easily chewed by animals and easily digested once swallowed. The pet chew is also created with a white coloring interspersed with colored crystals into a bone-like form that is appealing to both animals and their owners.

In one aspect of the present invention, an easily-digestible pet chew composition comprises a nonreactive sodium bicarbonate compound.

In another aspect of the present invention, the amount of sodium bicarbonate compound present is approximately 0.05% to approximately 1.0% by weight.

In yet another aspect of the present invention, the sodium bicarbonate compound is an nonreactive soap formed by the combination of sodium bicarbonate and a vegetable oil.

In a further aspect of the present invention, the vegetable oil is corn oil.

In still another aspect of the present invention, the pet chew further comprises sodium alginate to provide an abrasive texture to the pet chew.

In one aspect of the present invention, the sodium alginate is a hardened particle.

In another aspect of the present invention, the amount of sodium alginate present is approximately 0.215% to approximately 1.5% by weight.

In yet another aspect of the present invention, the sodium alginate is a mixture of a color additive.

In a further aspect of the present invention, the color additive is FD&C Blue #1.

In still another aspect of the present invention, the pet chew further comprises a flavoring pleasing to an animal.

In one aspect of the present invention, the flavoring is a natural liver flavor.

In another aspect of the present invention, further comprising amounts of glycerin and a preservative.

In yet another aspect of the present invention, the preservative is potassium sorbate.

In a further aspect of the present invention, a method of producing an easily-digestible pet chew comprises the acts of mixing a pet chew composition with a nonreactive sodium bicarbonate compound.

In still another aspect of the present invention, the method of producing an easily-digestible pet chew comprises the act of adding nonreactive sodium bicarbonate compound, the amount added is approximately 0.05% to approximately 1.0% by weight.

In one aspect of the present invention, the method of producing an easily-digestible pet chew comprises the act of forming the nonreactive sodium bicarbonate comprises mixing the sodium bicarbonate with a vegetable oil.

In another aspect of the present invention, the method of producing an easily-digestible pet chew comprises the act of adding vegetable oil, the vegetable oil added is corn oil.

In yet another aspect of the present invention, the acts of adding sodium alginate provide an abrasive texture to the pet chew.

In another aspect of the present invention, the method of producing an easily-digestible pet chew comprises the act of first extruding the sodium alginate into a hardened particle before being mixed into the pet chew.

In still another aspect of the present invention, the method of producing an easily-digestible pet chew comprises the act of adding sodium alginate, the amount added is approximately 0.05% to approximately 1.0% by weight.

In yet another aspect of the present invention, the method of producing an easily-digestible pet chew comprises the act of mixing the sodium alginate with a color additive during the extrusion process.

In another aspect of the present invention, the method of producing an easily-digestible pet chew comprises the act of adding a color additive, the color additive added is FD&C Blue #1.

In a further aspect of the present invention, the method of producing an easily-digestible pet chew comprises the act of adding a flavoring.

In another aspect of the present invention, the method of producing an easily-digestible pet chew comprises the act of adding a flavoring, the flavoring added is natural liver flavoring.

In one aspect of the present invention, the method of producing an easily-digestible pet chew comprises the act of adding amounts of glycerin as a humectant and a preservative.

In another aspect of the present invention, the method of producing an easily-digestible pet chew comprises the act of adding a preservative, the preservative added is potassium sorbate.

In one aspect of the present invention, a method for mixing sodium bicarbonate into a pet chew comprises the acts of reacting the sodium bicarbonate with a vegetable oil to form a nonreactive soap in the form of a sodium long chain fatty acid and mixing the nonreactive sodium bicarbonate with a pet chew composition.

In one aspect of the present invention, the method for mixing sodium bicarbonate into a pet chew comprises the acts of adding a vegetable oil, the vegetable oil added is selected from a group consisting of canola oil, sunflower oil, and corn oil.

BRIEF DESCRIPTION OF THE DRAWINGS

The objects, features and advantages of the present invention will be apparent from the following detailed descriptions of the preferred aspect of the invention in conjunction with reference to the following drawings, where.

DETAILED DESCRIPTION

Figure 1:
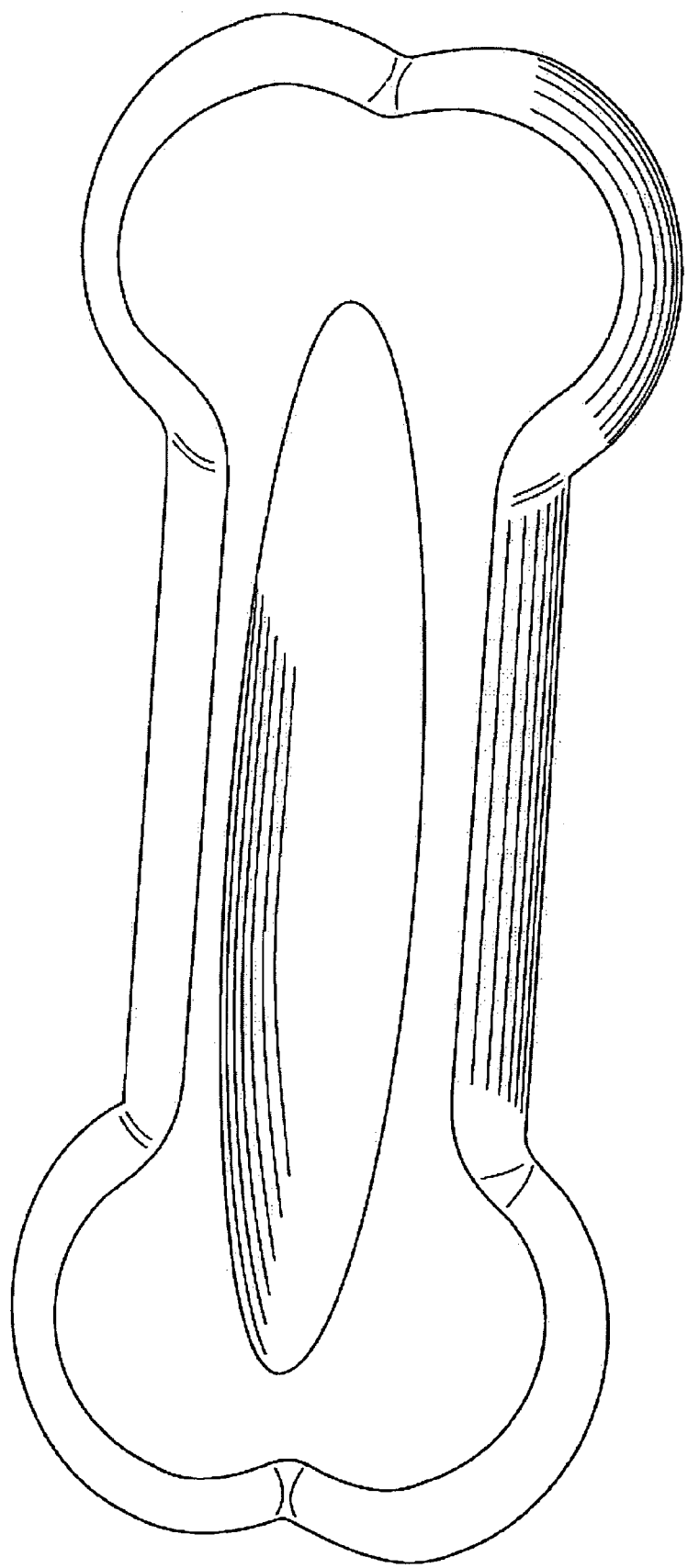
FIG. 1 is a perspective view of the rounded, flat bone shape of an edible pet chew according to one embodiment of the present invention.

The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

All percentages and ratios are calculated by weight unless otherwise indicated. All percentages and ratios are calculated based on the total composition unless otherwise indicated.

The compositions herein may comprise, consist essentially of, or consist of any of the features or embodiments as described herein.

(1) Overview

The present invention provides an easily-digestible pet chew that promotes oral health and prevents malodorous breath in animals. The pet chew is specifically formulated using single-processed wheat gluten, casein, and a protein colloid composition to produce a soft, malleable pet chew that promotes mastication and is quickly and completely digested by a pet. The pet chew is formed using an injection molding process that also enhances the soft texture of the pet chew. The pet chew is further infused with several abrasive agents including calcium carbonate, sodium alginate, and powdered cellulose. The texture of the calcium carbonate, sodium alginate, and powdered cellulose gently abrade the teeth to eliminate tartar and plaque while the animal is masticating. The unique soft texture encourages the animal to chew the treat longer without the chew breaking apart and being swallowed prematurely, which enhances the effectiveness of the abrasive elements. Additionally, if the animal does swallow the pet chew whole, the easily-digestible formulation is quickly dissolved in the stomach and intestine, greatly reducing the risk of choking or blockage. The process of forming the dog chew also results in the soft, pliable texture through the single-processing of the wheat gluten.

Baking soda is also implemented into the pet chew to eliminate malodorous breath in the animal. The baking soda, otherwise known as sodium bicarbonate, is first reacted with a vegetable oil to form a sodium long chain fatty acid that will not react with the other elements of the pet chew and cause chemical instability.

In one embodiment depicted in FIG. 1, for dogs, the pet chew is shaped like a bone to appeal to the dog, but has soft, rounded edges and a flat shape to reduce the risk of pieces breaking off and choking the animal or damaging the internal digestive lining. The dog chew also contains titanium dioxide to give the pet chew a more natural, white color that is pleasing to the animal and the owner. The pet chew can also be infused with blue crystals made from sodium alginate to give the pet chew a fresh healthy appearance that will be easily recognized by the owner and pet. Flavoring is also included to make the pet chew even more attractive. For dogs, a meat flavor such as a natural liver flavoring will make the treat taste better to the dog and encourage the dog to chew it longer and fully realize the benefits of the treat.

The following detailed description will discuss the pet chew in the context of its application for dogs specifically, but one skilled in the art will realize that similar principles can be adopted for other animals such as cats.

The specific benefits of the present invention including digestibility and malodorous breath control will now be discussed in more detail, along with the detailed ingredients used in a dog chew according to the present invention.

(2) Digestibility

The combination of single-processed wheat gluten, casein and a protein colloid are the primary ingredients that make the pet chew easily-digestible. Wheat gluten, a protein derived from wheat, becomes harder each time it is processed by extrusion. By only processing the wheat gluten one time, the protein maintains a molecular structure that is less dense. When combined with the milk protein casein, or sodium caseinate, the molecular structure remains weak. Therefore, the combination is easily broken down and dissolved by the digestive enzymes in a dog's mouth. The protein colloid, a combination of a pea protein and gelatin, also act further to hold the ingredients together in a soft, malleable mixture.

The specific advantages of the soft, malleable texture of the pet chew are due to the protein matrices that form from the combination of wheat gluten, casein and the protein colloid. Additionally, tapioca starch can also be added to further bind the materials in the pet chew together. During the injection molding process, the starch will gelatinize. These protein matrices provide a gummy, waxy texture that forces a dog to chew thoroughly before the pet chew will break apart. The additional chewing required increases the amount of contact the dog's teeth have with the abrasives and baking soda that are eliminating plaque, tartar and the bacteria that cause bad breath.

Simulated digestion tests showed that 94.3% of the pet chew dissolved after 24 hours, leaving an almost insubstantial portion of the chew remaining. This improved digestibility significantly reduces the risk of a dog choking on the pet chew or having the pet chew lodged in the intestinal tract.

(3) Baking Soda Implementation

The addition of baking soda to the pet chew aids in controlling malodorous breath in dogs. However, baking soda is highly reactive on its own when combined with the other listed ingredients in the pet chew. Specifically, the addition of pure sodium bicarbonate to the mixture releases carbon dioxide gas, which causes significant instability in the structure of the pet chew. To keep the carbon dioxide from forming, the sodium bicarbonate is first reacted with a vegetable oil to form a sodium long chain fatty acid. In one embodiment, the vegetable oil is corn oil; however, canola oil and sunflower oil are also acceptable. The sodium long chain fatty acid is a nonreactive soap that can be implemented safely into the pet chew mixture while still maintaining the original properties of baking soda; namely control of malodorous breath.

The amount of baking soda used is minute, and generally comprises approximately 0.05% to approximately 1.0% by weight. In one embodiment, baking soda makes up 0.5% by weight.

(4) Abrasives

The use of abrasives contributes to the pet chew's ability to improve overall oral hygiene in animals. Abrasive substances act simply to create friction against a dog's tooth when the dog is chewing the abrasive substance, thereby removing plaque and tartar buildup. In the present embodiment, the soft, malleable texture of the pet chew increases the amount of time that a dog will be chewing the pet chew, which increases the amount of time the abrasives are in direct contact with the teeth, and therefore the effectiveness of the abrasives in removing plaque and tartar buildup.

The primary abrasives used include calcium carbonate, powdered cellulose, and sodium alginate. The addition of baking soda provides a minor abrasive effect as well. In one embodiment, the sodium alginate is extruded separately with a coloring agent before being mixed with the other ingredients. Once the extrusion process is complete, the hardened particles of colored sodium alginate resists color loss even during the injection molding process. In one embodiment, the sodium alginate particles are a blue color and are interspersed throughout the pet chew to give the pet chew a sparkling appearance that is pleasing to both dogs and their owners. The concentration of sodium alginate can vary widely depending on the density of pieces desired in the chews, but a concentration between approximately 0.215% and approximately 1.5% by weight is desirable for providing an abrasive effect and a pleasing visual appearance. In an exemplary embodiment of the dog pet chew, the concentration is 0.215% by weight. The blue coloring used is FD&C Blue #1, although any color can be implemented depending on the visual effect desired.

(5) Process

The pet chews of the present invention are formed using an injection molding process that provides significant control over the shape and texture of the pet chew. First, the ingredients are blended together into a desired mixture, then placed in a hopper, where small amounts of the mixture are conveyed into a press in the shape desired for the pet chew. Significant heat and pressure are applied to mold the mixture into the shape desired.

After the injection molding process, the pet chews are cured for an extensive amount of time to aid in the evaporation of just the right amount of moisture such that the pet chew retains its malleability and does not become too hard. In one embodiment, the curing process results in a moisture content of approximately 18%.

(6) Additional Ingredients

The pet chew also includes titanium dioxide to provide the pet chew with a whiter appearance. This whitening effect creates a more natural bone-like color that is more acceptable to dogs and more pleasing to the dog owner. The concentration of titanium dioxide is approximately 0.25% to approximately 1.5% by weight, although it should be noted that current FDA rules limits this amount to 1.0%, the amount used in the dog pet chew embodiment described herein.

The pet chew can further include small amounts of glycerin to act as a humectant, and preservatives such as potassium sorbate to act as a mold inhibitor. A vegetable oil such as corn oil or canola oil is also included to act as a releasing agent during the injection molding process.

What is claimed is:

1. An easily-digestible pet chew composition comprising a nonreactive sodium bicarbonate compound, formed by reacting sodium bicarbonate with a vegetable oil.

2. The pet chew composition of claim 1, wherein the amount of sodium bicarbonate compound present is approximately 0.05% to approximately 1.0% by weight.

3. The pet chew composition of claim 1, wherein the sodium bicarbonate compound is a nonreactive soap.

4. The pet chew composition of claim 1, further comprising sodium alginate to provide an abrasive texture to the pet chew.

5. The pet chew composition of claim 4, wherein the sodium alginate is a hardened particle.

6. The pet chew composition of claim 4, wherein the amount of sodium alginate present is approximately 0.215% to approximately 1.5% by weight.

7. The pet chew composition of claim 4, wherein the sodium alginate is a mixture of a color additive.

8. The pet chew composition of claim 7, wherein the color additive is FD&C Blue #1.

9. The pet chew composition of claim 1, further comprising a flavoring pleasing to an animal.

10. The pet chew composition of claim 1, further comprising amounts of glycerin and a preservative.

11. A method of producing an easily-digestible pet chew comprising the acts of mixing a pet chew composition with a nonreactive sodium bicarbonate compound, wherein the nonreactive sodium bicarbonate is formed by reacting sodium bicarbonate with a vegetable oil.

12. The method of claim 11, wherein in the act of adding nonreactive sodium bicarbonate compound, the amount added is approximately 0.05% to approximately 1.0% by weight.

13. The method of claim 11, further comprising the act of adding sodium alginate to provide an abrasive texture to the pet chew.

14. The method of claim 13, further comprising the act of first extruding the sodium alginate into a hardened particle before being mixed into the pet chew.

15. The method of claim 13, wherein in the act of adding sodium alginate, the amount added is approximately 0.05% to approximately 1.0% by weight.

16. The method of claim 13, further comprising the act of mixing the sodium alginate with a color additive during the extrusion process.

17. The method of claim 16, wherein in the act of adding a color additive, the color additive added is FD&C Blue #1.

18. The method of claim 11, further comprising the act of adding a flavoring.

19. The method of claim 18, wherein in the act of adding a flavoring, the flavoring added is natural liver flavoring.

20. The method of claim 11, further comprising acts of adding amounts of glycerin as a humectant and adding a preservative.

21. A method for mixing sodium bicarbonate into a pet chew, the method comprising acts of:
    reacting the sodium bicarbonate with a vegetable oil to form a nonreactive soap in the form of a sodium long chain fatty acid; and
    mixing the nonreactive sodium bicarbonate with a pet chew composition.

22. An easily-digestible pet chew composition, comprising:
    a protein;
    a humectant;
    a fatty acid;
    a binding agent;
    gelatin;
    a whitening agent;
    a coloring additive and a nonreactive sodium bicarbonate compound obtained by reacting sodium bicarbonate with a vegetable oil.

23. The pet chew composition of claim 22, wherein the humectant is glycerin, the binding agent is starch, the whitening agent is titanium dioxide, and the coloring additive is blue coloring.

* * * * *